(12) United States Patent
Chen

(10) Patent No.: US 10,506,390 B2
(45) Date of Patent: *Dec. 10, 2019

(54) REQUEST TO HAND OVER A SESSION BETWEEN A MOBILE COMMUNICATION DEVICE AND A CUSTOMER PREMISES EQUIPMENT

(71) Applicant: ARRIS Enterprises LLC, Suwanee, GA (US)

(72) Inventor: Shi Jin Chen, Alpharetta, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,787

(22) Filed: Dec. 10, 2018

(65) Prior Publication Data

US 2019/0110169 A1 Apr. 11, 2019

Related U.S. Application Data

(63) Continuation of application No. 15/861,727, filed on Jan. 4, 2018, now Pat. No. 10,187,763, which is a continuation of application No. 13/631,404, filed on Sep. 28, 2012, now Pat. No. 9,894,501.

(60) Provisional application No. 61/618,255, filed on Mar. 30, 2012.

(51) Int. Cl.
*H04W 4/16* (2009.01)
*H04M 3/56* (2006.01)
*H04L 29/06* (2006.01)
*H04M 7/00* (2006.01)
*H04W 36/00* (2009.01)
*H04W 36/14* (2009.01)

(52) U.S. Cl.
CPC .......... *H04W 4/16* (2013.01); *H04L 65/1006* (2013.01); *H04L 65/1069* (2013.01); *H04L 65/1096* (2013.01); *H04M 3/561* (2013.01); *H04M 7/006* (2013.01); *H04W 36/0011* (2013.01); *H04W 36/14* (2013.01)

(58) Field of Classification Search
CPC ... H04W 4/16; H04W 36/0011; H04W 36/14; H04M 3/561; H04M 7/006; H04L 65/1096; H04L 65/1069; H04L 65/1006
See application file for complete search history.

(56) References Cited

U.S. PATENT DOCUMENTS

| | | | |
|---|---|---|---|
| 9,386,482 B1 | 7/2016 | Chen et al. | |
| 9,894,501 B2 | 2/2018 | Chen | |
| 10,187,763 B2 * | 1/2019 | Chen | H04W 36/0011 |
| 2008/0119187 A1 | 5/2008 | Gallagher et al. | |
| 2009/0147754 A1 | 6/2009 | Long et al. | |
| 2009/0170557 A1 | 7/2009 | Chauhan et al. | |

* cited by examiner

*Primary Examiner* — Omar J Ghowrwal
(74) *Attorney, Agent, or Firm* — Bart A. Perkins

(57) ABSTRACT

Methods, systems, and apparatus can be used to provide handover of on-hold sessions in converged networks. In various example implementations, an on-hold session between a mobile communication device and a fixed packet network-connected peer CPE can be handed over from a fixed packet domain to a cellular domain, and vice versa. In various example implementations, an on-hold session between a mobile communication device and a PSTN-connected peer CPE can be handed over from a fixed packet domain to a cellular domain, and vice versa.

20 Claims, 6 Drawing Sheets

REQUEST TO HAND OVER A SESSION BETWEEN A MOBILE COMMUNICATION DEVICE AND A CUSTOMER PREMISES EQUIPMENT

RELATED APPLICATIONS

This application is a continuation of U.S. application Ser. No. 15/861,727 titled "Handover of On-Hold Session Between Fixed Packet Network and Cellular Network," which was filed on Jan. 4, 2018. U.S. application Ser. No. 15/861,727 is a continuation of U.S. application Ser. No. 13/631,404 titled "Handover of On-Hold Session Between Fixed Packet Network and Cellular Network," which was filed on Sep. 28, 2012. U.S. application Ser. No. 13/631,404 is a nonprovisional application claiming the benefit of U.S. Provisional Application Ser. No. 61/618,255 titled "Fixed Mobile Convergence (FMC)—Example Implementations," which was filed on Mar. 30, 2012. The entirety of U.S. application Ser. Nos. 15/861,727, 13/631,404, and U.S. Provisional Application Ser. No. 61/618,255 is hereby incorporated by reference.

TECHNICAL FIELD

This disclosure relates to the handover of sessions between domains.

BACKGROUND

With the advent of modern communications, a variety of communications modalities and devices exist within a user's premises. Traditionally, customers made (and still make) telephone calls via the public switched telephone network (PSTN). Many data communications modalities exist, including several packet-based communications solutions that provide broadband access to the Internet and World Wide Web using, for example, Internet Protocol (IP). These include digital subscriber line service(s) offered through telcos, and data over cable services (e.g., broadband services over the networks traditionally provided by cable television operators). Although these packet-based broadband IP networks have been referred to as "fixed" because of the lack of mobility of the on-premises access point, these networks can still include the use of wireless technology. For example, wireless communications can be incorporated in the delivery infrastructure of the fixed packet network (such as satellite or radio transmission towers), and fixed packet networks can also be accessed via a local wireless network (which typically has limited range) such as a Wi-Fi™ (i.e., wireless) network.

These fixed packet networks have also allowed users to make telephone calls (voice calls) over them using by carrying voice packets over the fixed packet networks. This technology includes, for example, Voice over IP (VoIP) technology on a broadband IP network.

In concurrent developments, mobile/cellular communications devices, such as mobile handsets, have become ubiquitous in modern society. Mobile communications devices such as "smartphones" can allow users to make telephone calls, send or receive electronic mail (e-mail), browse the World Wide Web, check appointments, and get directions, as well as perform many other functions. Such mobile devices typically use cellular networks to handle telephone calls. However, cellular networks often vary in quality and coverage area. It is typical for users having a cellular phone service to discontinue a phone call on their mobile device and start another call using a fixed communications phone, such as a POTS phone (e.g., telephone connected to the PSTN) or VoIP phone, to communicate once the users are in their premises.

With the rise of VoIP and mobile/cellular networks, fixed-mobile convergence (FMC) represents an aim by the telecommunications industry to allow transitions between the fixed packet network communications domain and the mobile domain. As an example of such an FMC process, a user's in-progress communication session, which may be a voice call, can move from communicating through the mobile (i.e., cellular) network to communicating through a fixed packet network while the user is on the same mobile phone, and vice versa. This "handover" from a cellular domain to fixed domain (and vice versa) preferably occurs without any significant interruption or disconnection in the communication session noticeable by either user. The FMC network can allow, for example, a user that initiates a cellular phone call on his or her handset out of the premises to continue with the same call on the same handset, but on the fixed packet network, when the user arrives in his/her home. Conversely, if a user having a mobile handset places a call over the fixed packet network via the fixed packet network's wireless access point, and the signal to the wireless access point signal for the fixed packet network degrades (for example if the user moves outside the premises), a FMC service should allow the user to continue with the communication on the same mobile handset over the cellular network.

Implementations described in this disclosure provide for the handover of two sessions initiated by a user having a mobile communication device, wherein one session is active, and the other session is on hold. In the case of a session that is voice, an on-hold session would typically be a logical state in which neither user of the session can hear the other. Additionally, this disclosure provides for the handover of an on-hold session in which the on-hold session is between a mobile handset device and a peer CPE device connected to a fixed packet network, or between a mobile handset device and a peer CPE device connected to a PSTN network.

BRIEF DESCRIPTION OF THE DRAWINGS

Like reference numbers and designations in the various drawings indicate like elements.

DETAILED DESCRIPTION

In some implementations of this disclosure, systems and methods can operate to provide communication session handovers between fixed and cellular domains. This disclosure describes various implementations of systems and methods of a fixed mobile convergence network that can provide for the handover of an on-hold session, including a handover of the session from the fixed packet network to the mobile network. The on-hold session can be an on-hold session between an FMC enabled mobile communications device and a CPE device connected to a fixed packet network, or on-hold session can be between an FMC enabled mobile communications device and a CPE device connected to a PSTN. The components used in supporting this feature can include a mobility application server (MAS) operable to facilitate connections between a mobile communications device and user devices connected to a cellular network, PSTN network, or a fixed packet network (e.g., a broadband IP network). The following disclosure describes various implementations and changes operable to facilitate the session handover features in more detail.

Figure 1:
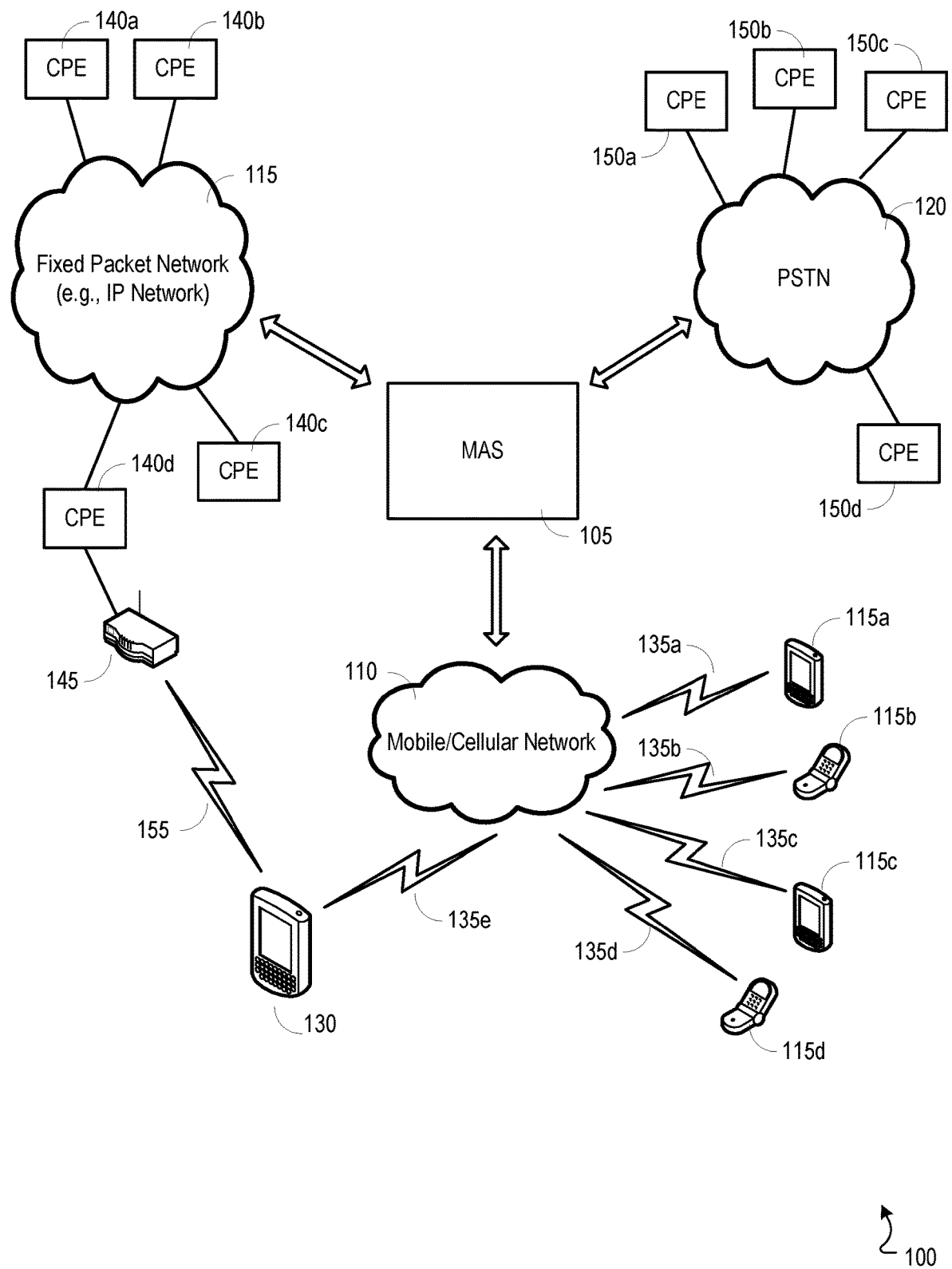
FIG. 1 is a block diagram illustrating an example network environment operable to provide handover of sessions in converged networks.

FIG. 1 is a block diagram illustrating an example fixed-mobile converged services network environment 100 operable to provide handover of one or more sessions in converged networks. The handover can occur between domains using handover public service identities (PSIs), wherein one of the sessions is, for example, an on-hold session between a mobile device and a CPE (e.g., a cable telephony modem) having a communications device connected to an IP network, and the other session is an active session. In some implementations, a mobility application server (MAS) 105 is operable to serve as a converged services platform that interconnects and routs communications to user devices, which can be connected to a cellular network 110, a fixed packet network 115, or a PSTN network 120.

The cellular network 115 can include a number of mobile communications devices 115a-d, 130 that communicate with cellular towers. Each of the cellular towers can communicate with mobile communications devices 115a-d, 130 in a cell assigned to that cellular tower. Mobile communications devices 115a-d, 130 can communicate with the cellular towers via wireless links 135a-e. The cellular network can be of any variety, including a Global System for Mobile communications (GSM), Universal Mobile Telecommunications System (UMTS), Long Term Evolution (LTE), Code Division multiple access (CDMA) system, General Packet Radio Service (GPRS), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN). Typical multiplexing schemes used by these networks can include, among others, frequency division (FDM), time division multiple access (TDM), code division multiplex (CDM), and space division multiplex (SDM), each of which can use appropriate access schemes (e.g., FDMA, TDMA, CDMA, and SDMA). Mobile devices 115a-d, 130 can include cellphones, smartphones, portable computing devices, as well as other devices capable of carrying data and voice.

The fixed packet network 115 can be, for example, a network a communications network capable of using packets to deliver video, voice, and data. Fixed packet networks can include broadband networks such as those that deliver data using internet protocol (IP). An example of such a network is a cable television (CATV) infrastructure implementing the data over cable service interface specification (DOCSIS) and PacketCable standards. In some implementations, the fixed packet network can have headend equipment such as a cable modem termination system (CMTS) that transmits and receives communications through one or more hybrid fiber coax (HFC) networks to CPE devices 140a-d. The headend, HFC network(s), and CPE devices 140a-d can be provided by multiple service operators (MSOs) that provide community cable television service to users. The CPE 140a-d, each of which has its own MAC address, can include cable modems (CMs), cable telephony modems (a.k.a. embedded multi-media terminal or EMTA devices), and on-premises gateways. Telephones and other computing devices can be connected to the cable modems or EMTAs. Additionally, CPE devices 140a-d can have the functionality of telephones or other computing devices integrated into the CPE device 140a-d. The CPE 140a-d can also be connected to a wireless local area network (WLAN) device, such as, for example, wireless access point 145. Wireless access point 145 can be a wireless router that operates in accordance with the IEEE 802.11 family of standards and serve as an access point to the fixed packet network 115 for a computing device (e.g., personal computer, laptop, or tablet), or a multi-modal handset device as referred to below. Alternatively, the CPE 140a-d can have internal wireless routing functionality incorporated into it.

The fixed packet network 115 can also include networks using asynchronous transfer mode (ATM), digital subscriber line (DSL), or asymmetric digital subscriber line (ADSL) technology. These networks have typically been provided by telephone companies (telcos). ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber. For the user to access the DSL network, customer premises equipment 140a-d (each of which can have its own MAC address), can include, for example, a DSL modem. The DSL modem can also include wireless routing functionality or can be connected to a wireless access point (examples of which were discussed above).

In addition to data over cable and DSL based solutions as described above, the fixed packet network(s) 115 can also be provided via legacy T1/T3 lines, or WiMAX™ networks implementing the IEEE 802.16 family of wireless networking standards, or any combination of those packet switched networks described herein or known in the industry.

FIG. 1 also illustrates a PSTN network 120, having customer premises devices 150a-d, such as telephones and computers, connected to the PSTN 120. The PSTN 120 can be connected to the cellular network 110 and the fixed packet network 115 via the mobility application server 105.

In example implementations, mobile communication device 130 (e.g., which can also be referred to herein as a FMC mobile device 130), can include client software that facilitates its operation as a multi-modal handset that can communicate via both a cellular network and via a fixed packet network. For example, the mobile communication device 130 can communicate via cellular network 110, using wireless link 135e. Wireless link 135e can include IP, GSM, LTE, Wi-MAX™ (i.e., Worldwide Interoperability for Microwave Access), Wi-Fi™ (i.e., wireless), or CDMA links. As another example, FMC mobile device 130 can access fixed packet network 115, by communicating with the wireless access point 145 via wireless data link 155. The FMC mobile device 130 can also be operable to transmit communications and perform functions relating to the on-hold/off-hold and handover functions described herein.

In example implementations, a mobile communications device 130 can be operable to communicate with the MAS 105. The MAS 105 can handle messaging and routing between the cellular network 110, fixed packet network 115, and the PSTN 120. The MAS 105 can be a computing device having software that makes it operable to provide the functionalities described herein. In example implementations, the MAS 105 can be operable to process signaling protocols, for example SIP, and handle session setup, session connect, session management, and session teardown. The MAS 105, operating as a SIP server, can function as one or more of a registrar server, a location service database, a redirect server, a proxy server, or a presence server. The MAS 105 can be placed or reside on any of the networks (e.g., within a headend of the fixed packet network 115).

In some implementations, the MAS 105 can perform gateway functions. Gateways that link fixed packet network with a PSTN, a PSTN with a cellular network, and an IP network with the cellular network are typically deployed and used to route communications, including voice, between the different types of networks. The MAS 105 can process one or more signaling protocols, including but not limited to SIP, SIP-T, GSM, CDMA, MAP, and SS7. For example, in instances in which a session is routed from fixed packet network 115 to the PSTN 120, or a session is routed from the PSTN 120 to fixed packet network 115, the MAS 105 can be used to translate communication protocols (for example, IP to TDM) between the networks. The MAS 105 can be operable to convert packet based voice (e.g., VoIP) communications to circuit switched voice for transmission on the PSTN 120, and can convert circuit switched voice to packet based voice communications for transmission onto a fixed packet network 115. In example implementations using Session Initiation Protocol (SIP) communications, SIP universal resource identities (URIs) can be used to carry telephone numbers, since the mapping between SIP and telephony protocols has already been defined.

The MAS 105 can facilitate routing of communications with the FMC mobile device 130 through the use of a location service and location service database, which can periodically receive updates (e.g., a location beacon) from the mobile communications device 130. The location service identifies the location (e.g., cell) associated with the FMC mobile device 130 and stores the location information in a current location store such that incoming sessions destined for the mobile communications device 130 can be properly routed. Thus, for example, an incoming session can be routed to a cellular tower close in proximity to the mobile communications device 130 (e.g., the cellular tower responsible for the cell from which the last beacon signal was received).

In example implementations, the MAS 105 can also be operable to function as a proxy server by processing, for example, SIP requests and passing the request downstream, as well as sending SIP responses upstream to other SIP servers or devices. The MAS 105 can also modify SIP requests, and enable the setup, teardown, and modification of communications sessions.

In example implementations, when a wireless data link 155 is available, the mobile communications device 130 can communicate with the MAS 105 through the fixed packet network 115 via the wireless access point 145 and the wireless data link 155. In the case of a voice call, the mobile communications device can be operable to send and receive voice packets through the fixed packet network 115. The FMC mobile device 130 can also initiate a communication session through the cellular network 110 via communications link 135.

As mentioned above, once a request for a session has been made by the FMC mobile device 130, the MAS 105 can be operable to facilitate the establishment, teardown, or modification of sessions between FMC mobile device 130 and other peer devices, including mobile devices 115a-d, CPE devices 140a-c connected to the fixed packet network 115 (e.g., which can be referred to herein as FPN peer CPE 140a-c), and/or CPE devices 150a-d connected to the PSTN 120 (e.g., which can be referred to herein as PSTN peer CPE 150a-d).

As an example, FMC mobile device 130 can initiate a session via the cellular network 110 with a FPN peer CPE 140a-c. As mentioned above, the FPN peer CPE 140a-c can include a cable modem, a DSL modem, an ADSL modem, an E-MTA, a gateway, or the like, and computing devices or telephones can be attached to FPN peer CPE 140a-c. The FMC mobile device 130 can send an active session request (e.g., a session setup request) through the cellular network 110 to the MAS 105. The MAS 105, upon receiving the request, facilitates the session setup between the mobile communications device 130 and the FPN peer CPE 140a-c. For the active session, the MAS 105 can create an anchor point establishing two connections points for the session—one connection point for the MAS-FMC mobile device 130 through the cellular network 110 connection, and another connection point for the MAS-FPN peer CPE 140a-c through the fixed packet network 115 connection. In the instance whereby the communications are between the FMC mobile device 130 and a PSTN peer CPE 150a-d, the MAS 105 can establish an active session, anchoring the session with a connection point for the MAS-FMC mobile device 130 through the cellular network 110, and a connection point for the MAS-PSTN peer 150a-d through the PSTN 120 connection. Similarly, a session can be established via the MAS 105 between the FMC mobile device 130 and another mobile device 115a-d on the cellular network (which can also be referred to as cellular peer 115a-d). Additionally, the MAS 105 can establish sessions based on requests from any of the aforementioned user devices that are directed to the FMC mobile device 130. Some example implementations of an active session establishment process can be found in U.S. Pat. No. 8,244,251 titled "Concurrent Call Handover," the entirety of which is hereby incorporated by reference.

In an example in which a session has been established through the cellular network 110, the MAS 105 can be operable to accept and handle the handover of the session from the cellular network 110 to the fixed packet network 115. This linking of the home wireless local area network and a user's FMC mobile device 130 provides convenience when FMC mobile device 130 is within the range of the user's on-premises wireless LAN. Handovers from the cellular network 110 to the fixed packet network 115 can also be seen as a way to offload session traffic from the cellular network 110 to the fixed packet network 115. Additionally, voice sessions through the fixed packet network 115 can have more clarity, in some instances.

An example of a handover process can be illustrated when a session between FMC mobile device 130 and PSTN peer CPE 150a has already been established through the cellular domain (i.e., over the cellular network 110). When FMC mobile device 130 enters the wireless transmission/reception range of local wireless access point 145 (e.g., which can be a Wi-Fi™ (i.e., wireless) router used to establish an on-premises wireless local area network (WLAN)), a handover request can be initiated by the FMC mobile device 130.

In some implementations, the FMC mobile device 130 can be registered or associated with the WLAN. Typical wireless routers can continuously generate a signal (e.g., a beacon), which can be referred to as a presence signal, indicating that the wireless network is active. This signal, which can be received by the FMC mobile device 130, typically includes an identifier, such as the Basic Service Set Identifier (BSSID), which is a unique identifier related to the MAC address of the wireless access point 145.

Upon receiving the presence signal from wireless access point 145, the FMC mobile device 130 can be operable to transmit the BSSID of wireless access point 145 to the MAS 105. The BSSID can be transmitted by the mobile communications device 130 via, for example, a SIP message through the fixed packet network 115. Another mechanism for transporting BSSID information corresponding to the wireless network in which the FMC mobile device 130 is currently present may include using P-Access-Network-Info which is known in the art for transmitting network type. It will be appreciated that other formats/protocols may also be used to transmit/forward the BSSID of the WLAN to the MAS 105. When the MAS 105 receives a handover request (e.g., including the handover PSI, appropriate identifiers for the WLAN network, FMC user account information for the mobile communications device 105) from the FMC mobile device 130, the MAS 105 processes the request. The processing can include updating dynamic databases, request authentication, and performing the handover via the fixed packet network 115, as described above.

Prior to the handover, the anchor point for the session would have two connection points—one for the MAS-FMC mobile device 130 through the cellular network 110, and the other for the MAS-PSTN peer CPE 150a-d through the PSTN 120. After the handover, the anchor point would feature the MAS-FMC mobile device 130 connection point through the fixed packet network 115, while the MAS-PSTN peer CPE 150a-d connection point through the PSTN 120 is maintained.

Conversely, communications established through the wireless data link 155 have a limited range. The MAS 105 can operate to handover sessions between an IP network and the cellular network 110 using the PSIs associated with the session. Thus, when a user moves his/her FMC mobile device 130 out of range of a wireless access point 145, the MAS 105 can keep the session open and establish a connection to the FMC mobile device 130 via the cellular network 110.

In some implementations, if the FMC mobile device 130 moves out of range of the wireless access point 145, and into range of another wireless access point (not shown), the session can be routed through the fixed packet network 115 by using the new wireless access point, including a wireless access point at another location (provided the FMC device 130 has authority to access that wireless access point). Thus, the MAS 105 can facilitate session handoff between multiple different wireless access points.

In some implementations, the MAS 105 can keep track of two PSI session identifiers and the FMC mobile device 130 can be provisioned for multiple PSIs, thereby facilitating session handover in situations where the FMC mobile device 130 has two or more open sessions. In additional implementations, the FMC mobile device 130 can be set to attempt to handover the oldest session (e.g., first initiated session) first, and the most recent session (e.g., last initiated session) last. In such implementations, the MAS 105 and the FMC mobile device 130 can keep track of the duration of the sessions open by a device 130. Thus, the MAS 105 can identify which session is being handed over first, and which session is being handed over last (and the order of any other sessions being handed over).

In some implementations, one session is active, and another session is "on-hold," a status in which the user has placed one of the calling parties on hold, while it is actively speaking with another. In some implementations, to place the session on-hold, the FPN peer CPE 140a-c can be operable to process an on-hold request by not transmitting or receiving media. In other implementations, the FMC mobile device 130 can effectuate the on-hold status by not sending out any media (or sending out only background noise generated by the FMC mobile device 130), and also by discarding any media it receives. In yet other implementations, the FPN peer CPE 140a-c can be placed in a "send only" state, and the FMC mobile device 130 can be programmed to discard packets it receives; the call's status is that of being on-hold, since the FPN peer CPE 140a-c is not receiving media (i.e., in a send only state), and the FMC mobile device 130 is discarding media it receives.

In some implementations, in a session through the fixed packet network 115 between the FMC mobile device 130 and a PSTN peer CPE 150a-d (or with the FPN peer CPE 140a-c) the MAS 105 can be operable to place the session on hold. The MAS can process an on-hold request from either the FMC mobile device 130 or the peer CPE. In some implementations, the MAS can place the session on hold by, for example, blocking or discarding media that it receives from the peer CPE, or by blocking the or discarding the media from the FMC mobile device.

To describe an example call handover process of two sessions (one active, and one on-hold), the FMC mobile device 130 can have one session with FPN peer CPE 140a, and another concurrent session with PSTN peer CPE 150a, wherein both sessions are through the fixed packet network domain (i.e., communications for the session are being delivered via the fixed packet network 115). When the link 155 from the access point 145 is not strong or begins to degrade (e.g., presence signals are becoming irregular), the FMC mobile device 130 can attempt to hand over both sessions so as to communicate through the cellular network 110. The FMC mobile device 130 can be operable to identify which session is on hold, and which session is active, and will hand over the on-hold session first. Because current cellular network implementations only allow one active session to be initiated from the same device, if the active session was handed over first, that session would have to be put on hold before another handover request can be initiated. However, it may not be the desire of the FMC mobile device 130 to put that active session on hold. Thus, handing over the on-hold session first can reduce the number of on-hold off-hold transactions, and also provide for a more seamless handover. One example of a handover process in which the on-hold session is handed over first is described in the "Concurrent Call Handover" patent mentioned above.

A condition can arise in which an on-hold communication through the fixed packet network between a peer CPE device communicating with an FMC mobile device is unable to go back to an off-hold status after the handover of the session to the cellular domain. In prior art cellular network implementations the on-hold or off-hold status of any session through the cellular network (e.g., cellular network 110) is controlled at the cellular network level; on-hold/off-hold requests are handled by the cellular network, and an on-hold/off-hold command would not be passed through the cellular network (e.g., cellular network 110) to the MAS, and subsequently not to any peer CPE. For example, for a session between the FMC mobile device 130 and a peer CPE (e.g., FPN peer 140a-c, or PSTN peer 150a-d, or mobile peer 115a-d) through the cellular domain, if the FMC mobile device 130 sends an on-hold request to the cellular network, the cellular network processes the request by preventing the delivery of communications from the FMC mobile device 130 to the peer CPE device. Likewise, once an off-hold request is processed by the cellular network, the cellular network would allow packets between the FMC mobile device 130 and the peer CPE devices to flow through the cellular network.

To illustrate this situation in which a communication session cannot return to an off-hold state, the peer CPE communicating with the FMC mobile device 130 through the fixed packet network 115 can first be placed on-hold. If the peer CPE is connected to the fixed packet network (FPN peer 140a-c), it might have been placed in a "send only" mode, for example. If the peer CPE is connected to the PSTN network (e.g., PSTN peer 150a-d), the MAS 105, operating as a gateway, can be instructed to prevent communications between the FMC mobile device 130 and the PSTN peer 150a-d, for example. When the session is handed over to the cellular network 110, the FPN peer 140a-c would still be in a send-only mode, or the MAS would still be blocking communications between the FMC mobile device 130 and the PSTN peer 150a-d. If the FMC mobile device 130 (now communicating through the cellular network 110 after the handover) sends a request to take the communication session between the peer CPE off-hold, the request would not be passed to either the FPN peer CPE 140a-c, or to the MAS 105. The FPN peer CPE 140a-c would remain in a send-only state, or the MAS 105 would still be blocking transmitted media. The users would have to disconnect and request another communication session (e.g., in the case of a voice call, make another call).

For this situation, in some implementations, prior to sending out the handover request for an on-hold session between the FMC mobile device 130 and a peer CPE (e.g. FPN peer CPE 140a-c or PSTN peer CPE 150a-d) can send an off-hold request through the IP network to put communication session back on active status prior to the handover (e.g., to start sending and receiving packets). The request can be sent to the MAS 105, which can forward the request to the FPN peer CPE 140a-c, or the request can be processed by the MAS 105 to allow communications to flow between the FMC mobile device 130 and the PSTN peer CPE 150a-d. Once the handover has occurred, the FMC mobile device 130 can without user input put the communication back on hold by sending an "on-hold" request that is processed by the cellular network 110. Although the FPN peer CPE 140a-c is actually active and can send and receive messages (or the MAS 105 is allowing communications between the FMC mobile device 130 and the PSTN peer CPE 150a-d), the cellular network 110 processes the on-hold request by blocking media between the FMC mobile device the other devices. When the user desires to take the communication off-hold, the user can send an off-hold signal from mobile device 130, which is also processed by the cellular network 110. Because FPN peer 140a-c (or MAS 105) had already been placed in an active state prior to the handover, the removal of the hold at the cellular level would allow communications to fully flow. Thus, the handover of this on-hold session involves momentarily turning the on-hold session into an active communication session, despite the fact that the users desired an on-hold state. Because the handover and immediate blocking of media at the cellular domain can happen quickly, users might not perceive any media exchanges between the mobile device 130 and the CPE 140a, providing an apparently seamless handover of an on-hold session. After the on-hold session has been handed over, any other active sessions can be subsequently handed over as well.

Figure 2:
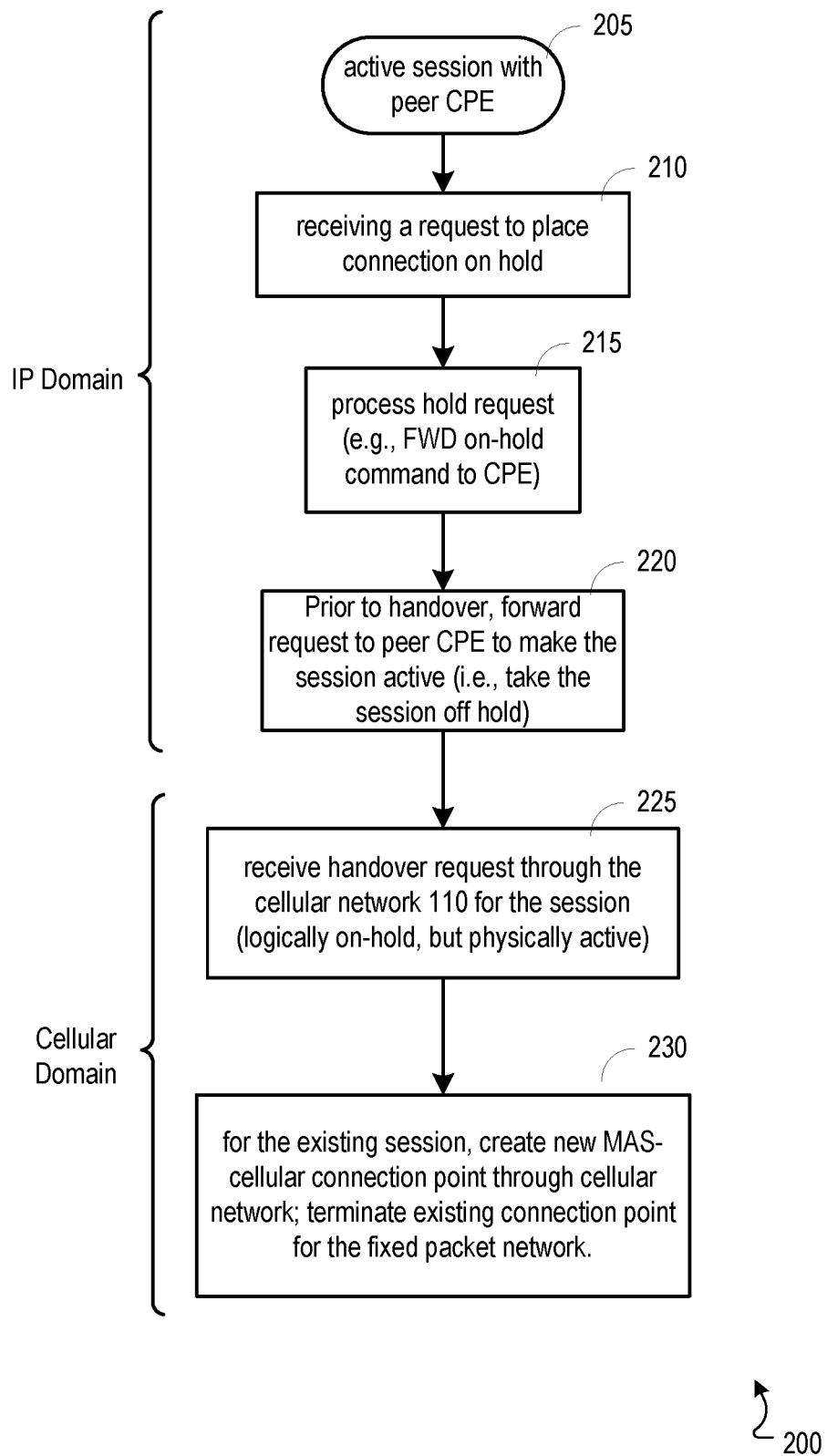
FIG. 2 is a flow chart illustrating an example process that can be performed by a mobility application server to facilitate the transfer of an on-hold session between a mobile communications device and peer CPE connected to a fixed packet network.

FIG. 2 is an example process 200 that can be performed for administering the handover of an on-hold session between an FMC mobile device (e.g., FMC mobile device 130 of FIG. 1) and a peer CPE device connected to an IP network (e.g., FPN peer CPE 140a of FIG. 1). The process can be performed by a mobility application server (e.g., MAS 105 of FIG. 1). The FPN peer CPE can be a broadband modem, for example a DSL modem, a broadband gateway device, cable modem, or cable telephony modem. Communications devices, such as a computer (e.g., laptop, PDA, tablet, etc.) or telephone (e.g., landline telephone or other mobile phone(s)), can be attached to FPN peer CPE. However, other mobile application servers, routers, routing devices, and computers can be enabled with software operable to perform the process.

The process 200 can begin at stage 205, wherein a session has been established. The session can be established by the MAS (e.g., MAS 105 of FIG. 1). The session can be established, for example, as a voice call between the FMC mobile device (e.g., FMC mobile device 130 of FIG. 1) and FPN peer device (e.g., FPN peer device 140a of FIG. 1) through a fixed packet network network (e.g., fixed packet network 115 of FIG. 1).

The process 200 can move to stage 210, wherein a request to place the session between the FMC mobile device and the FPN peer CPE "on hold" has been received. The FMC mobile device (e.g., mobile device 130 of FIG. 1) can send the request to place the session on hold to the MAS (e.g., MAS 105 of FIG. 1). The request to place the session "on hold" can be received by the mobility application server (e.g., MAS 105 of FIG. 1). The hold request can be initiated by the user pressing one or more keys on the FMC mobile device, thereby indicating that the user wishes to place the session with the FPN peer CPE on hold. At stage 215, the request to place the session on hold can be processed. The request can be processed by the MAS (e.g., MAS 105 of FIG. 1). The MAS can process the session, for example, by sending or forwarding the on-hold request to the FPN peer CPE (e.g., FPN peer CPE 140a of FIG. 1).

As mentioned above, prior to a handover to the cellular domain, the FMC mobile device can send a request to place the FPN peer CPE back to active state, so that after the handover (after the user requests that the session be taken off-hold), the FPN peer CPE can communicate with the FMC mobile device 130. Thus at stage 220, this request to place FPN peer CPE (e.g., FPN peer CPE 140a of FIG. 1)

on active status prior to the handover can be forwarded to the FPN peer CPE. It can be forwarded by the MAS (e.g., MAS 105).

At stage 225, the handover request is received. The handover request can be received for example from an FMC mobile device (e.g., FMC mobile device 130 of FIG. 1) and can be received by the MAS (e.g., MAS 105 of FIG. 1).

At stage 230, the handover request can be processed. The handover request can be processed, for example, by the MAS (e.g., MAS 105 of FIG. 1). In accordance with the handover process described above, a new connection point is made through the second network (e.g., the wireless network 110) for the same session, and the previous connection point can be terminated. Thus, in this example, the MAS-FMC mobile device connection point the cellular network is established, while the MAS-FMC mobile device connection point through the IP network is terminated when the connection point in the cellular network is established.

As mentioned above, prior to the handover, the FPN peer CPE was placed on active status, even though the user parties were logically still on hold. To remain on hold after the handover, such that media sent by the FPN peer CPE is not transmitted through the cellular network to the FMC mobile device, and media from the FMC mobile device is not sent to the FPN peer CPE, the FMC mobile device sends a command to the cellular network to place the session on hold.

Figure 3:
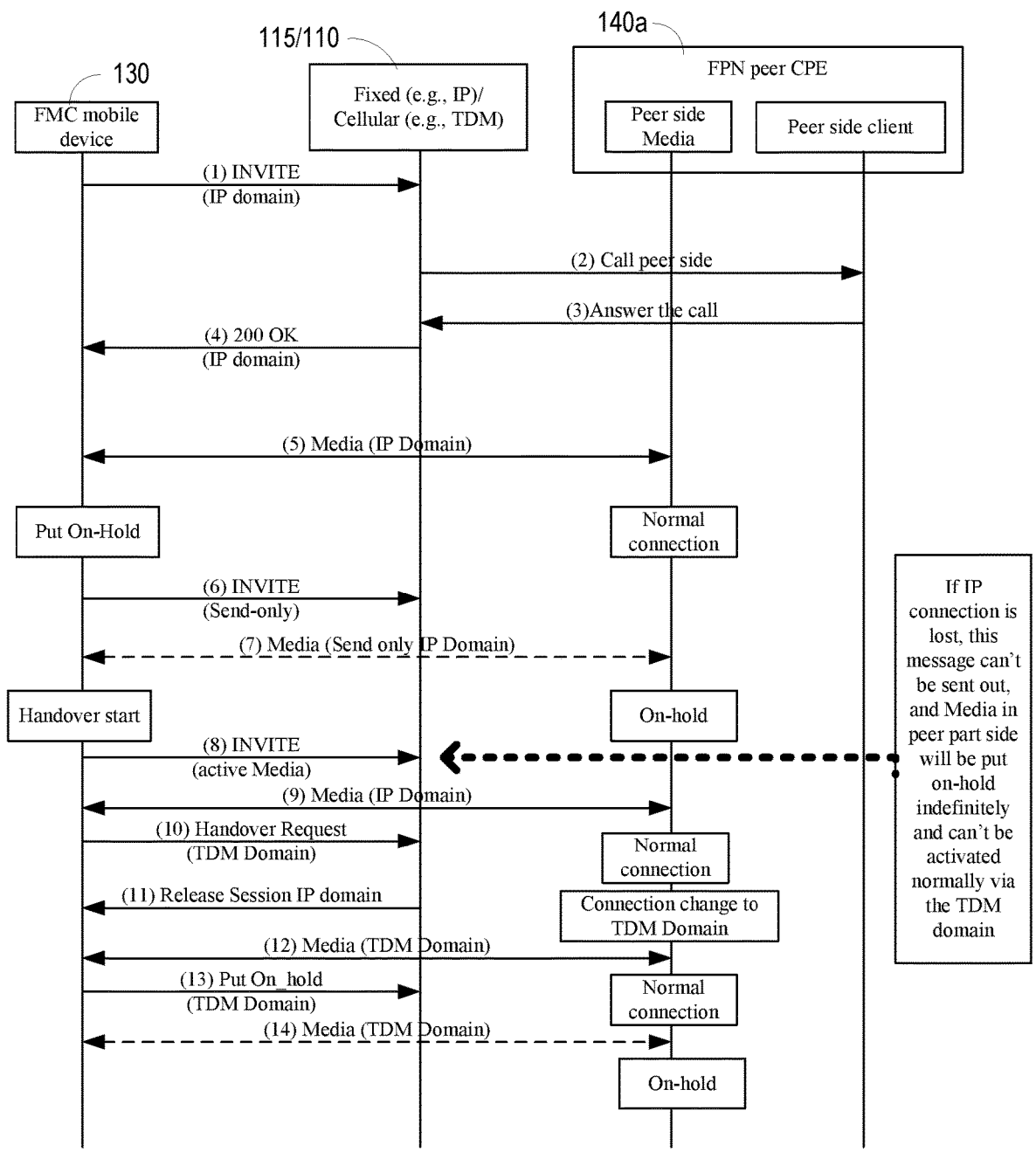
FIG. 3 is a sequence diagram illustrating an example implementation of a handover process of an on-hold session between a mobile communications device and peer CPE connected to a fixed packet network.

FIG. 3 shows an example sequence diagram of an implementation in which the handover of an on-hold session from the fixed packet network domain (e.g., an IP domain) to the cellular domain (e.g., TDM domain) is conducted, wherein the peer party CPE device 140a is connected to a fixed packet network 115 (e.g., FPN peer CPE 140a). At stage (1), a session setup is initiated by a message (e.g., a SIP INVITE message) sent from FMC mobile communications device (e.g., FMC mobile device 130). In this example, FMC mobile device 130 is within range of a wireless access point (for example, wireless access point 145), and the session setup request is sent via the IP domain (e.g., via fixed packet network 115).

A mobility application server (e.g., MAS 105) can process this request and at stage (2), the request is directed to an FPN peer CPE 140a. The FPN peer CPE 140a can include separate modules for session setup (e.g., peer side client) and for transmission/reception of media (e.g., data or VoIP packets).

At stage (3), the session is answered. The session can be answered, for example, by a CPE 140a. At stage (4) a confirmation can be sent back to the mobile communication device 130. The confirmation can be, for example, a "SIP 200 OK" message. However, other forms of confirmation can be used based on the particular protocols being used.

Once the session has been established, media data is exchanged at stage (5). The FMC mobile device 130 can exchange media data (in the case of a VoIP call, e.g., voice packets) with the FPN peer CPE 140a.

The user might want to put the session between the mobile device 130 and the FPN peer CPE 140a on hold. At stage (6) the FMC mobile device 130 can send a request to the MAS 105 to put the FPN peer CPE 140a on hold. The request can be in the form of a SIP Invite that is Send-only, meaning that the FPN peer CPE 140a can send media messages, but not receive media messages for the current communication session; when the session is on hold, the mobile device 130 can be operable to discard media it receives from the FPN peer CPE 140a. Thus, when the media includes voice packets, then at stage (7), the CPE 140a can send voice packet communications to the mobile device 130, but the user of the mobile device will not be able to hear any voice. Moreover, if the mobile device 130 sends any packets to the FPN peer CPE 140a, the FPN peer CPE 140a will not be able to receive them because FPN peer CPE 140a is in send-only mode. In this manner, a hold condition can be effectuated.

If the FMC mobile device 130 moves out of range of the wireless access point 145 (or if the wireless signal is no longer strong), then FMC mobile device 130 at stage (8) can send a message to FPN peer CPE 140a to take FPN peer CPE 140a off hold so that FPN peer CPE 140a can send and receive media packets. Thus, at stage (9) the session is an active session again (although logically on hold). At stage 10, the FMC mobile device 130 can send out a handover request (e.g., a request to initiate a session) via the TDM domain (e.g., via the cellular network 110). Once a normal connection is established in the cellular domain, the MAS 105 at stage (11) can release the session IP domain. (e.g., terminate the connection point for the MAS 105-FMC mobile device 130 through the fixed packet network 115), and send a "BYE" SIP message to the FMC mobile device 130. Having handed over the session to the cellular domain, the FMC mobile device 130 and FPN peer CPE 140a at stage (12) are in an active session whereby media (e.g., VoIP packets) can be exchanged again, but now through the cellular network 110. However, because the session was an on-hold session previously (logically), the FMC mobile device 130 at stage (13) will request with the cellular network 110 that the session that the session be on hold. As mentioned above, it is the cellular network 110 (not the MAS 105) that controls this hold by blocking messages at the cellular network level. Thus, at stage (14), media can be sent by the peer CPE 140a, and can be sent by the mobile communications device 130, but the communications will not pass through the cellular network 110.

A situation can arise, however, in which the active media "Invite" message of stage (8) is not received by the MAS 105, or is lost. This situation might occur because the wireless access point 145 is no longer in range. If this situation arises, the FPN peer CPE 140a is not placed on active status for the session prior to the handover, and once the handover occurs, remains in a Send-only state. The FPN peer CPE 140a will be unable to return to an active state should the user desire to take the FPN peer CPE 140a off hold, because, as mentioned above, in current cellular network implementations, off-hold messages are processed at the cellular network 110 level and are not communicated to the MAS 105. Because the MAS 105 is not notified, the message is not communicated to the FPN peer CPE 140a. Thus, the FPN peer CPE 140a can be in a send only state for a long time with respect to the session, and the session might have to be terminated, and new session re-initiated.

Figure 4:
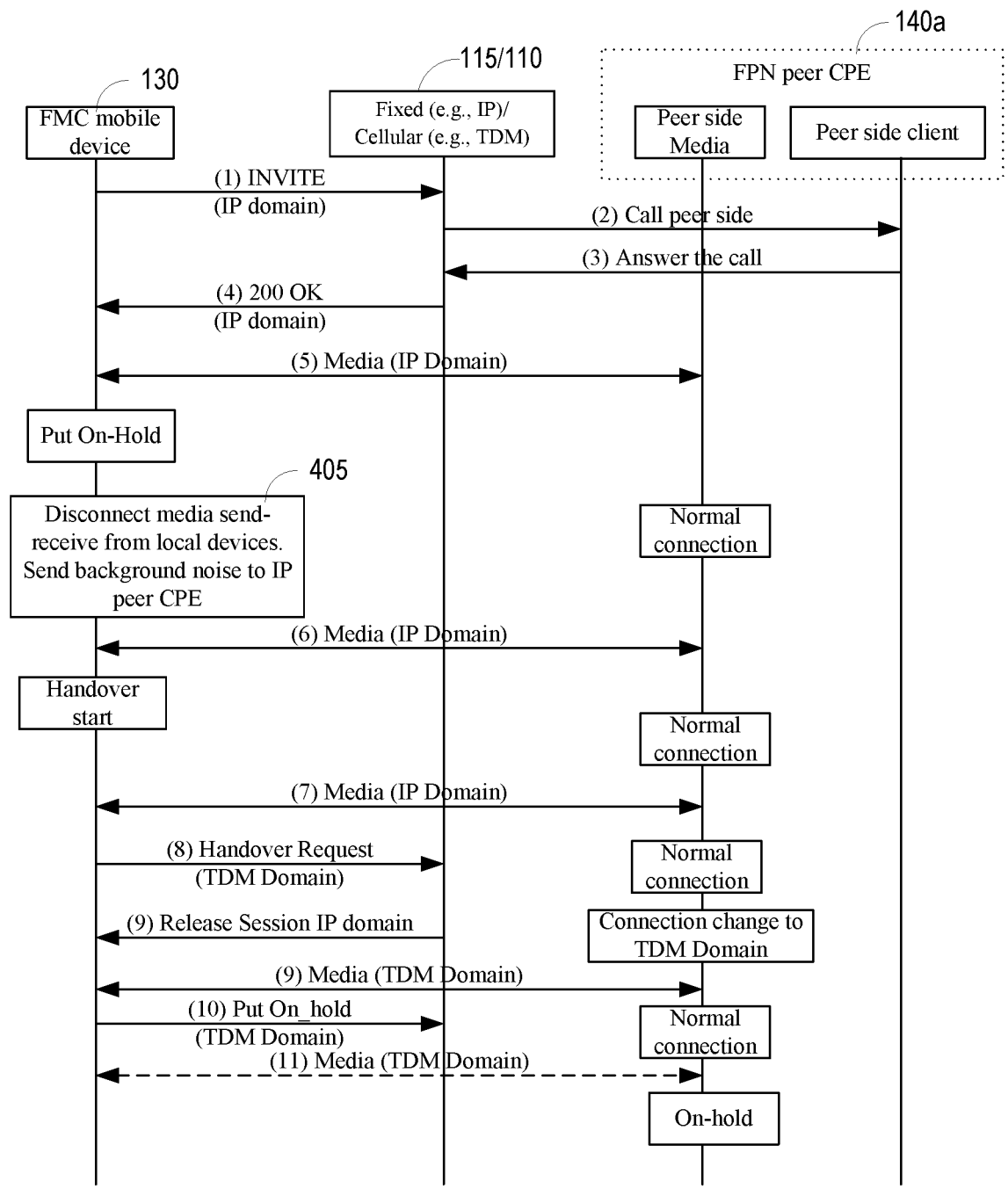
FIG. 4 is a sequence diagram illustrating another example implementation of a handover process of an on-hold an on-hold session between a mobile communications device and peer CPE connected a fixed packet network.

FIG. 4 provides an example implementation to address the instance in which the SIP active media INVITE of stage (8) might become lost. The process is similar to that of FIG. 2. In FIG. 4, stage (6) of FIG. 2 which was a "SIP send only Invite" to place the FPN peer CPE 140a on send-only status, is eliminated. Rather, if putting the session on hold is the desired status, the FMC mobile device 130 can discontinue sending out media, and disregard any packets it receives from FPN peer CPE 140a while on hold, as represented by block 405 of FIG. 4. Thus, in the case of a voice call, neither user will hear voice information, even though the session remains active. When the wireless IP signal begins to degrade or is out of range, and handover occurs, there is no need to place the FPN peer CPE 140a back on active after the handover, because the session between the FMC mobile device 130 and the FPN peer CPE 140a was already active. After the handover, the FPN peer CPE 140a is still able to send and receive signals, but the on-hold condition remains for stage (10) when the FMC mobile device 130 places an on-hold request to the cellular network 110. After the FMC mobile device 130 places an off-hold request, the FPN peer CPE 140a media can flow through the cellular network 110 again, and can receive media directed at FPN peer CPE 140a through the cellular network 110.

Figure 5:
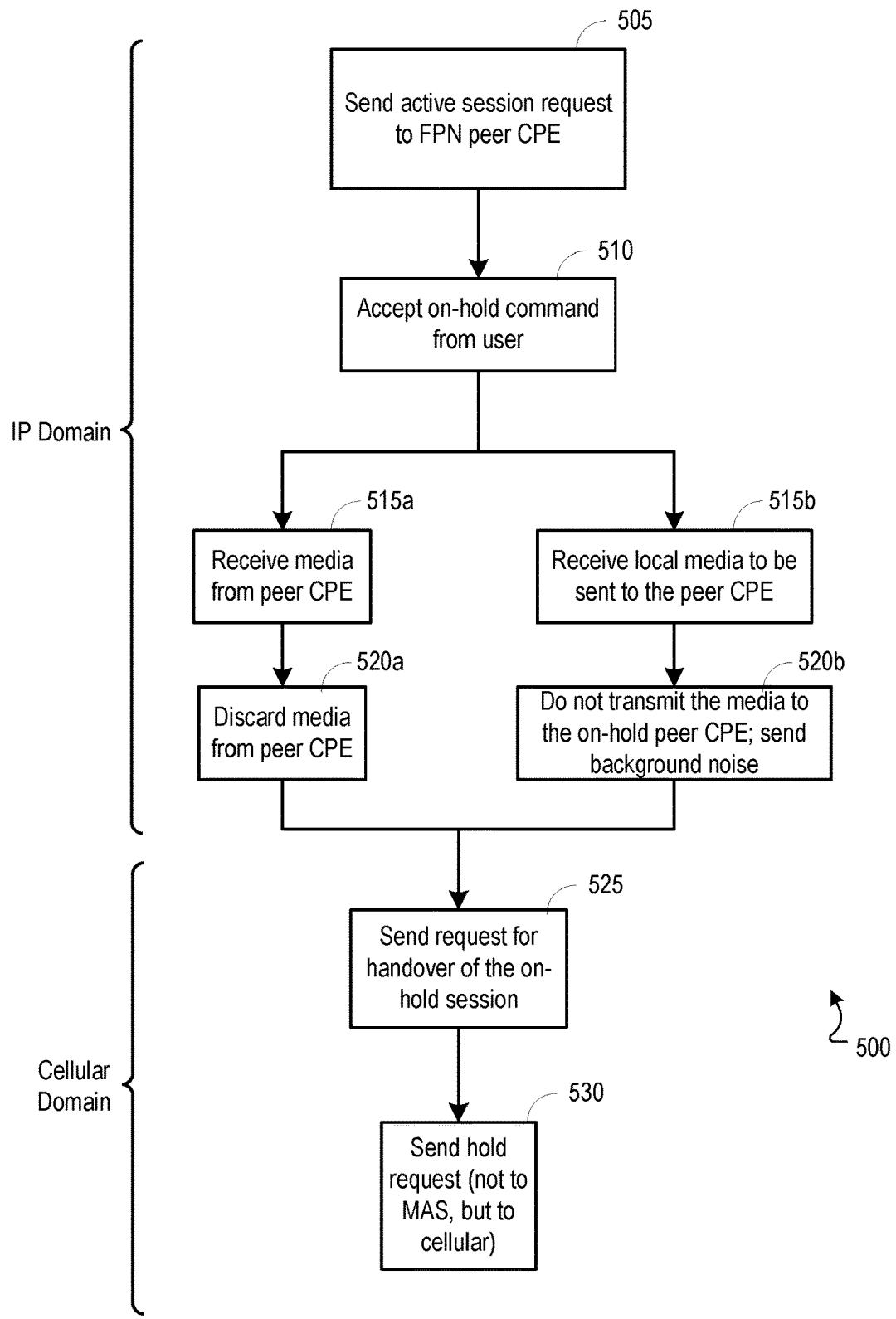
FIG. 5 is flow chart illustrating an example process that can be performed by a mobile communication device to enable on-hold features between a mobile communications device and peer CPE connected to a fixed packet network.

FIG. 5 is a flow chart of an example process 500 in accordance with FIG. 4 for handing over an on-hold session performed by a FMC mobile device (e.g., FMC mobile device 130). The process can begin at stage 505, wherein an active session request can be sent. The active session request can be sent, for example, by an FMC mobile device (e.g. FMC mobile device 130 of FIG. 1) through an IP network (e.g., fixed packet network 115 of FIG. 1) to a mobility application server (e.g., MAS 105 of FIG. 1). The request can signal the setup of a session, such as a voice call, between the mobile device and an FPN peer CPE (e.g., FPN peer CPE 140a of FIG. 1).

After the session with FPN peer CPE has been established, at stage 510, an on-hold command is accepted from the user. The on-hold command can be, for example, initiated by the FMC mobile device based on a depressed "hold" button, a flash of the call button, a voice command from the user, or some other type of user input indicating a desire to place the session on hold.

As mentioned above with FIG. 4 and distinguished from the example of FIG. 5, the FMC mobile device does not send any messages to the FPN peer CPE (for example, a Send-only Invite) to place the session in a hold condition (or a Send-only condition). Rather, at stage 515a, because the FPN peer CPE device has never been taken off of active, FPN peer CPE can still send communications to the FMC mobile device, and the FMC mobile device at stage 515a can still receive media communicated by the FPN peer CPE.

To effectuate the on-hold condition, the FMC mobile device can be operable to discard the media from the FPN peer CPE at stage. At stage 520a, in the case of a session that is a voice call, the user of the FMC mobile device does not hear any voice from the FPN peer CPE as those packets have been discarded by the FMC mobile device.

Additionally, at stage 515b, in the on-hold condition, any local media (for example, voice) of the FMC mobile device can be received by the operable module of the mobile communications device. However, this media will not be transmitted to the FPN peer CPE since the condition of the session is still on-hold.

Thus, even though the FPN peer CPE is active and can send and receive media, the on-hold condition is still effectuated because the FMC mobile device is discarding received packets from the FPN peer CPE and any substantive media (e.g., voice) originating at the FMC mobile device is not being transmitted to the FPN peer CPE.

When the MFC mobile device moves out of the effective range of the IP domain, for example it moves out of effective range of the wireless access point 145, at stage 525 a request can be sent by the FMC mobile device through the cellular network (e.g., cellular network 110) to handover the on-hold communications session between the FMC mobile device and the FPN peer CPE.

After the handover, at stage 530, an on-hold request can be sent by the FMC mobile device to the IP network to place the session between the FMC mobile device and the FPN peer CPE, which had been on hold in the IP domain, on hold in the cellular domain. Here, the cellular network handles the on-hold processing. In other example implementations, to continue the on-hold condition between the FMC mobile device and the FPN peer CPE, instead of sending an on-hold request to the cellular network for processing, the mobile communication device can continue to discard media received from the FPN peer CPE, and continue to not transmit media to the FPN peer CPE.

If the user decides to take the session off hold, the FMC mobile device can send an off-hold request to the cellular network or in other example implementations can discontinue discarding media received from the FPN peer CPE and begin transmitting media to the FPN peer CPE.

In the instance that the FMC mobile device is communicating with a peer CPE (e.g., PSTN peer CPE 150a) connected to the PSTN (e.g., PSTN 120), a similar implementation can be used. The gateway of the mobility application server (e.g., MAS 150) can be operable to control the on-hold call (i.e., prevent messages into and out of the PSTN 120 for the session with the PSTN peer CPE 150a). Here, in this implementation, instead of sending a message to the FPN peer CPE to put the session on hold (or sending a Send-only SIP message), the FMC mobile device would direct this request at the MAS 105. Referring to FIG. 3, the transactions of stage (6) and stage (8) would be directed to the MAS 105 to place the PSTN peer CPE on hold (or send only status). Just as with the session between the mobile communication device and FPN peer CPE, the on-hold and off-hold requests in the cellular domain are controlled by the cellular network 110.

Figure 6:
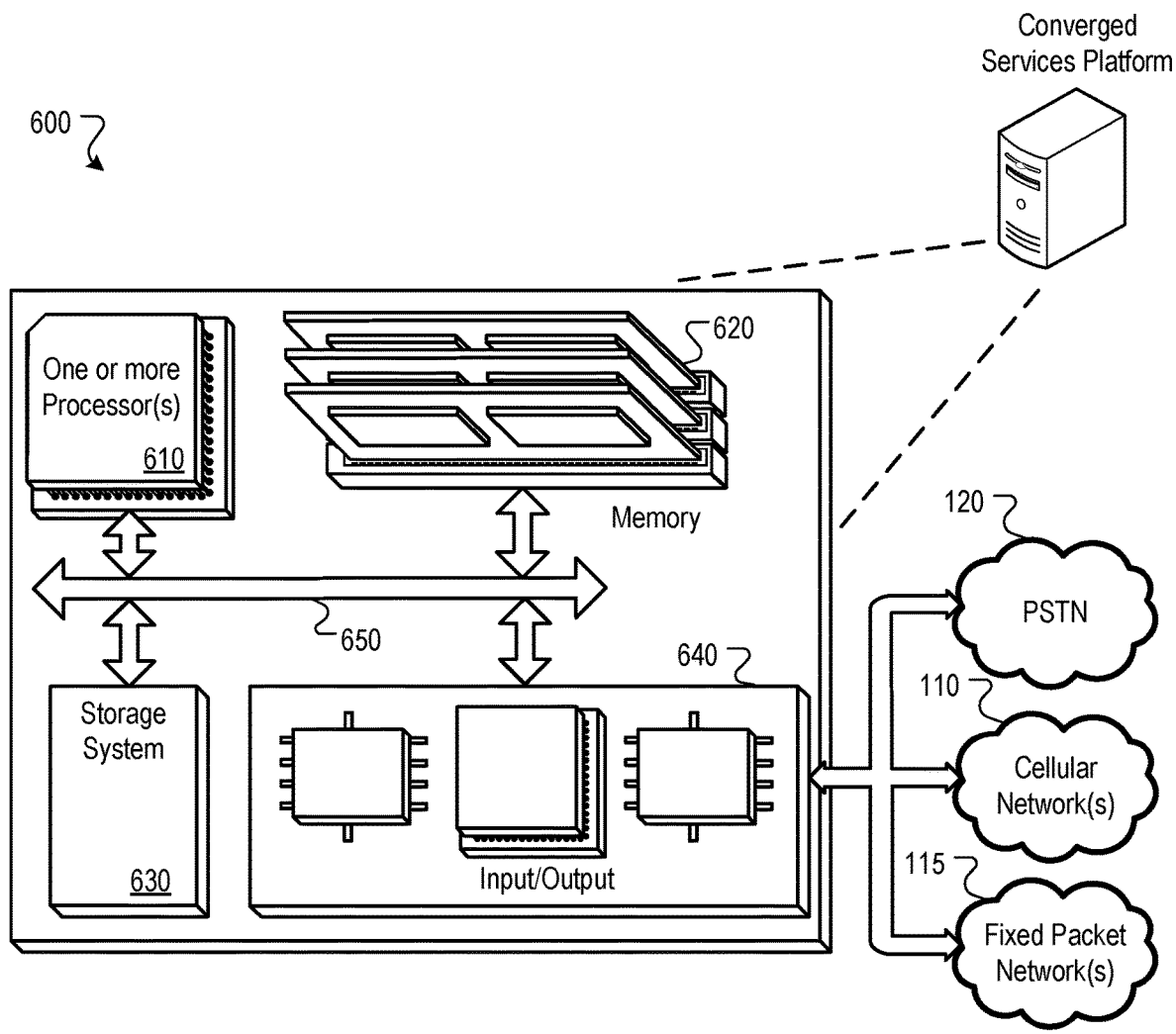
FIG. 6 is a block diagram illustrating an example of a hardware device that can be used to process the handover of an on-hold session between a mobile communications device and peer CPE connected to an IP network.

FIG. 6 is a block diagram illustrating some components of an example MAS 105 or an FMC mobile device 130 operable to facilitate handovers and on-hold/off-hold requests in accordance with the description herein. The hardware 600 can include a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the device 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the device 600. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the device 600. In one implementation, the input/output device 640 can include one or more of a PSTN trunk interface (e.g., an RJ11 connector), an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The MAS and FMC mobile communication device of this disclosure, and components thereof, can be realized by instructions that upon execution cause one or more processing devices to carry out the processes and functions described above. Such instructions can, for example, comprise interpreted instructions, such as script instructions, e.g., JavaScript™ (i.e., Java programming language) or ECMAScript™ (i.e., scripting-language specification) instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operablely coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular implementations of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for handing over a session between a mobile communication device and a customer premises equipment which is connected to a packet network, the method comprising:
    sending a session request through the packet network to a mobility application server, wherein the session is between a mobile communication device and a customer premises equipment connected to the packet network;
    initiating, by the mobile communication device, an on-hold command;
    in response to the initiation of the on-hold command:
    receiving media from the customer premises equipment;
    discarding the media received from the customer premises equipment;
    receiving local media at the mobile communication device; and
    withholding a transmission of the received local media from the mobile communication device;
    sending a request to hand over the session between the mobile communication device and the customer premises equipment through a second network.

2. The method of claim 1, wherein the packet network comprises a broadband network.

3. The method of claim 1, wherein the packet network comprises an IP network.

4. The method of claim 1, wherein the mobile communication device is operable to communicate through a packet network, and also through a cellular network.

5. The method of claim 1, wherein the mobility application server forwards the session request to the customer premises equipment.

6. The method of claim 1, wherein the session request comprises a SIP Invite.

7. The method of claim 1, wherein handing over the session comprises an establishment of a connection point and a termination of a connection point.

8. The method of claim 1, wherein the customer premises equipment comprises a modem.

9. The method of claim 1, wherein the packet network comprises a data over cable network.

10. The method of claim 1, wherein the second network comprises a cellular network.

11. A system for handing over a session between a mobile communication device and a customer premises equipment which is connected to a packet network, wherein the system comprises a system processor which is configured to:
    send a session request through the fixed packet network to a mobility application server, wherein the session is between a mobile communication device and a customer premises equipment connected to the packet network;
    initiate an on-hold command;
    in response to the initiation of the on-hold command:
    receive media from the customer premises equipment;
    discard the media received from the customer premises equipment;
    receive local media; and
    withhold a transmission of the received local media;
    send a request to hand over the session between the mobile communication device and the customer premises equipment through a second network.

12. The system of claim 11, wherein the packet network comprises a broadband network.

13. The system of claim 11, wherein the packet network comprises an IP network.

14. The system of claim 11, wherein the mobile communication device is operable to communicate through a packet network, and also through a cellular network.

15. The system of claim 11, wherein the mobility application server forwards the session request to the customer premises equipment.

16. The system of claim 11, wherein the session request comprises a SIP Invite.

17. The system of claim 11, wherein handing over the session comprises an establishment of a connection point and a termination of a connection point.

18. The system of claim 11, wherein the customer premises equipment comprises a modem.

19. The system of claim 11, wherein the packet network comprises a data over cable network.

20. The system of claim 11, wherein the second network comprises a cellular network.

* * * * *